United States Patent
Fiteni et al.

(10) Patent No.: US 7,693,760 B1
(45) Date of Patent: Apr. 6, 2010

(54) METHOD AND APPARATUS FOR PROVIDING A TAX SERVICE THAT IS CONFIGURABLE FOR LOCAL JURISDICTIONS

(75) Inventors: Alexander O. Fiteni, Foster City, CA (US); Paulo V. Back, Redwood Shores, CA (US); Isaac J. William, Santa Clara, CA (US); Harshavardhan Takle, Belmont, CA (US); Desh Deepak, Santa Clara, CA (US); Roberto M. Vono Silva, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 797 days.

(21) Appl. No.: 10/106,729

(22) Filed: Mar. 26, 2002

(51) Int. Cl.
    *G06F 17/22* (2006.01)
(52) U.S. Cl. .............................. 705/31; 705/19; 705/30
(58) Field of Classification Search .................. 705/31, 705/35, 27
    See application file for complete search history.

(56) References Cited

U.S. PATENT DOCUMENTS 6,185,683 B1 * 2/2001 Ginter et al. ................ 713/176
2002/0091602 A1 * 7/2002 Stern et al. ..................... 705/35
2002/0198805 A1 * 12/2002 Burkhardt .................... 705/35
2003/0055754 A1 * 3/2003 Sullivan ....................... 705/31
2004/0019540 A1 * 1/2004 William et al. ................ 705/31
2004/0019541 A1 * 1/2004 William et al. ................ 705/31
2004/0184170 A1 * 9/2004 Duroux et al. .............. 359/877
2004/0230490 A1 * 11/2004 Barsade et al. ................ 705/26
2004/0230525 A1 * 11/2004 Barsade et al. ................ 705/40

* cited by examiner

*Primary Examiner*—F. Zeender
*Assistant Examiner*—Faris Almatrahi
(74) *Attorney, Agent, or Firm*—Park, Vaughan & Fleming LLP

(57) ABSTRACT

One embodiment of the present invention provides a system that implements a tax service that is configurable for local jurisdictions by an expert in the field, such as a tax professional, who may have little or no knowledge of computer programming. The system operates by receiving a request from a subscriber, wherein servicing the request involves calculating taxes for one or more local jurisdictions. Tax rules for a local jurisdiction can be fed into a tax rule base that is used by a tax engine that is configured to use these externally specified rules in performing tax computations. Next, the system uses the tax engine to calculate taxes for each local jurisdiction, and subsequently uses the results of the calculations in servicing the request.

26 Claims, 5 Drawing Sheets

METHOD AND APPARATUS FOR PROVIDING A TAX SERVICE THAT IS CONFIGURABLE FOR LOCAL JURISDICTIONS

BACKGROUND

1. Field of the Invention

The present invention relates to computer-based systems for calculating and administering taxes. More specifically, the present invention relates to a method and an apparatus for providing tax services in a manner that is configurable for local jurisdictions.

2. Related Art

As companies expand their businesses beyond national borders and into the global marketplace, it is becoming increasingly harder to ensure that taxes are accurately determined. Determining taxes and managing tax compliance on a global scale is an enormously complicated task because each legislature with a right to levy taxes within its jurisdictional boundaries can establish its own set of taxes, as well as its own set of rules for regulating tax compliance. For example, in the United States alone there are over 6,000 individual jurisdictions that have the right to levy taxes, and perhaps that many more again worldwide.

The ad-hoc nature of the information required to calculate taxes makes codification and structuring of such information difficult. Consequently, existing computer-based systems for managing tax compliance are custom-built for each jurisdiction. This requires large amounts of programmer time to build systems for each jurisdiction, which can result in a considerable expense. Moreover, adding new countries or complying with new rules involves producing yet even more code, and consequently requires even more programmer time. Unfortunately, much of this programmer time is wasted because similar solutions are typically developed for each of the different jurisdictions.

Moreover, tax rules continually change for each jurisdiction. Hence, the underlying code for a computer-based tax management system must be continually modified to keep pace with these changes. At present, these changes are made at significant cost by a skilled programmer operating under the direction of a tax expert for each of the different jurisdictions.

What is needed is a method and an apparatus for determining taxes and managing tax compliance requiring little or no programming for individual tax jurisdictions.

SUMMARY

One embodiment of the present invention provides a system that implements a tax service that is configurable for local jurisdictions. The system operates by receiving a request from a subscriber, wherein servicing the request involves calculating a tax for a local jurisdiction. Tax rules for the local jurisdiction (in a computer-readable format) can be fed into a tax engine that is configured to use these externally specified rules in performing tax computations. Next, the system uses the tax engine to calculate the tax for the local jurisdiction, and subsequently uses the result of the calculations in servicing the request.

In one embodiment of the present invention, receiving the tax rules additionally involves receiving tax data for the local jurisdiction, wherein the tax data includes one or more tax rates. In a variation on this embodiment, feeding the tax rules into the tax engine involves storing the tax rules in a tax rule base within the tax engine. It additionally involves storing the tax data into a tax knowledge base within the tax engine, wherein the tax knowledge base is separate from the tax rule base.

In one embodiment of the present invention, the tax rules for the local jurisdiction are received from a third party.

In one embodiment of the present invention, servicing the request optionally involves utilizing a service provided by a third party in order to service the request.

In one embodiment of the present invention, calculating the tax involves first determining a taxable basis for the request, and then determining an applicable tax rate for the request based upon the tax rules for the local jurisdiction. It also involves calculating the tax, and optionally feeding the result of the calculation into an accounting system, as well as other business processes like Sales Order processing and Accounts Payable.

In one embodiment of the present invention, receiving the tax rules for the local jurisdiction involves receiving tax rules for tax regimes and taxes that are applicable to the local jurisdiction.

In one embodiment of the present invention, calculating the tax involves determining which tax regimes, taxes and tax jurisdictions are applicable. It also involves determining the tax status and performing the tax (amount) computations.

In one embodiment of the present invention, prior to receiving the request from the subscriber, the system receives a registration request from the subscriber to register with the tax service. In response to this registration request, the system registers the subscriber with the tax service, so that the subscriber can send requests to the tax service.

Table 1 illustrates different tax regimes, tax jurisdictions and taxes for different countries in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices, such as disk drives, magnetic tape, CDs (compact discs) and DVDs, and computer instruction signals embodied in a transmission medium (with or without a carrier wave upon which the signals are modulated). For example, the transmission medium may include a communications network, such as the Internet.

Distributed Computer System

Figure 1:
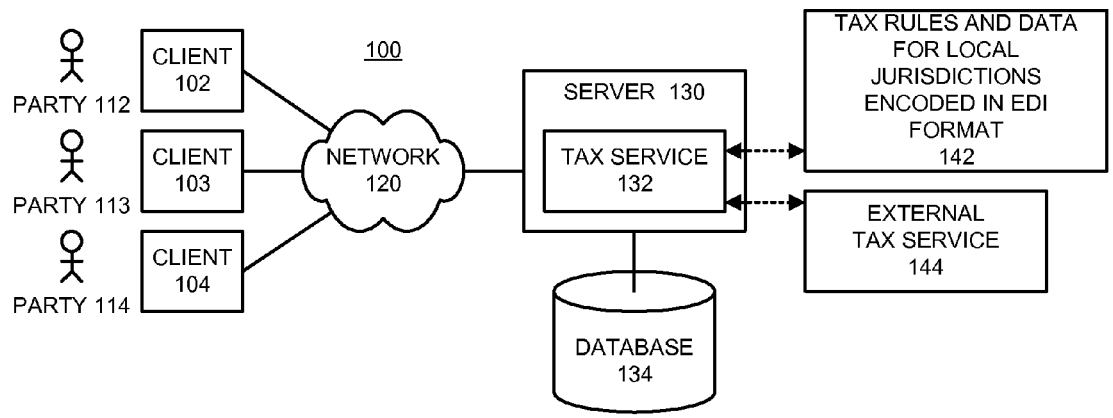
FIG. 1 illustrates a distributed computer system in accordance with an embodiment of the present invention.

FIG. 1 illustrates distributed computer system 100 in accordance with an embodiment of the present invention. Distributed computer system 100 includes a number of clients 102-104 coupled to a server 130 through a network 120.

Clients 102-104 can generally include any device on a network including computational capability and including a mechanism for communicating across the network. Clients 102-104 operate under control of parties 112-114, respectively.

Server 130 can generally include any computing device including a mechanism for servicing requests from clients 102-104 for computational and/or data storage resources. Note that clients 102-104 and server 130 can generally include any type of computing device, including, but not limited to, a computer system based on a microprocessor, a mainframe computer, a digital signal processor, a portable computing device, a personal organizer, a device controller, and a computational engine within an appliance.

Network 120 can generally include any type of wire or wireless communication channel capable of coupling together computing nodes. This includes, but is not limited to, a local area network, a wide area network, or a combination of networks. In one embodiment of the present invention, network 120 includes the Internet.

Server 130 is coupled to a database 134, which contains data that is used by applications running on server 130. Note that these server-based applications may be running on behalf of remote applications on clients 102-104. Database 134 can generally include any type of system for storing data in non-volatile storage. This includes, but is not limited to, systems based upon magnetic, optical, and magneto-optical storage devices, as well as storage devices based on flash memory and/or battery-backed up memory.

Server 130 acts as a host machine for tax service 132. This allows applications running on clients 102-104 to make requests across network 120 to tax service 132 running on server 130. For example, an application running on client 102 can send a request to tax service 132 to perform the tax calculation, including determination of the local jurisdictions involved and, further, performing the computations necessary for each of the local jurisdictions.

Note that tax service 132 is configured so that it can receive tax rules and data for local jurisdictions 142 from an external source, such as a tax expert for the local jurisdiction. Furthermore, tax rules and data 142 can be encoded in a published format, such as extensible markup language (XML) or electronic data interchange (EDI) format, to facilitate receiving the tax rules and data 142 from different sources. Note that tax rules and data 142 can be communicated to tax service 132 across network 120.

Tax service 132 is additionally configured so that it can operate with an external tax service 144 provided by an external tax service provider. In this way, the external tax service provider can perform an operation, such as a database lookup or a tax computation, in order to facilitate completing a tax operation for a specific jurisdiction. Furthermore, note that this external tax service provider may be located on a remote server that is accessible through network 120. A given request can be partially fulfilled by tax service 132 using tax rules and data 142 for one or more local jurisdictions, while using an external tax service provider to perform the computations for another local jurisdiction that might be simultaneously applicable.

Tax Service Structure

Figure 2:
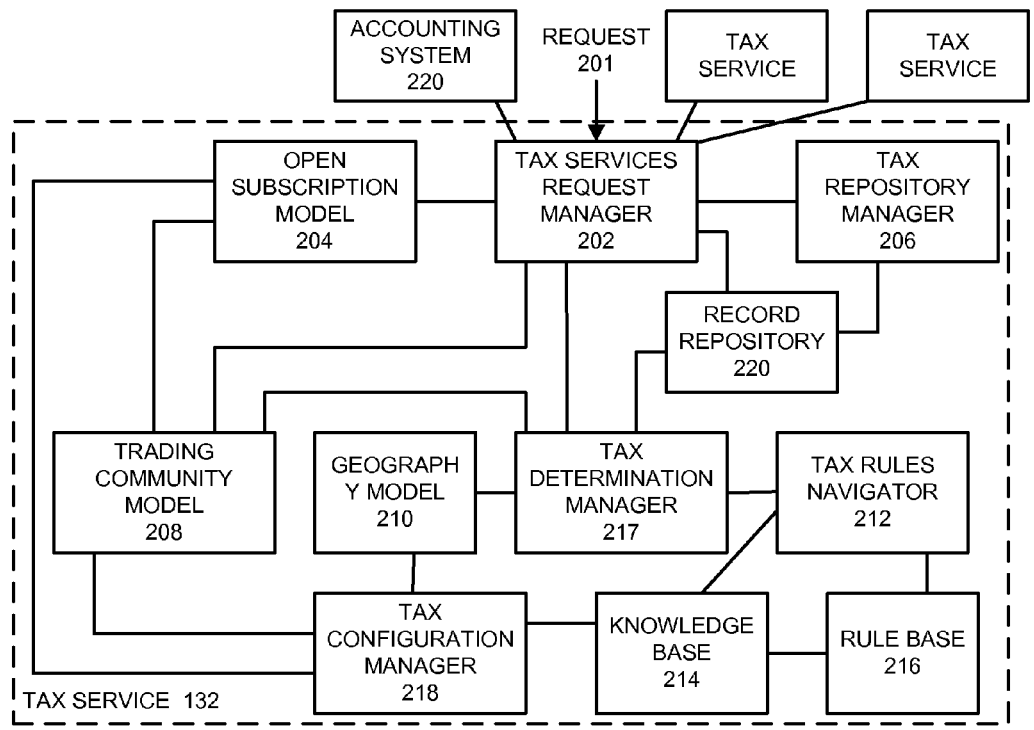
FIG. 2 illustrates the structure of a tax service in accordance with an embodiment of the present invention.

FIG. 2 illustrates the structure of tax service 132 in accordance with an embodiment of the present invention. Tax service 132 includes a number of modules, including tax services request manager (TSRM) 202, open subscription module 204, tax repository manager 206, trading community architecture (TCA) model 208, geography model 210, tax determination manager 217, tax rules navigator 212, tax configuration manager knowledge base 214 and rule base 216.

TSRM 202 generally manages interactions between external business transactions and tax processing operations. In one embodiment of the present invention, TSRM 202 is implemented as a set of methods. As is illustrated in FIG. 2, TSRM 202 receives a request 201 to perform an operation from an application running on one of clients 102-104.

Open subscription model 204 defines the security and access protocols used by TSRM 202 as well as tax rules navigator 212, tax determination manager (TDM) 217 and tax configuration manager (TCM) 218. It also allows subscribers, such as parties 112-114, to select and receive services from either tax service 132 and/or various external service providers, such as tax service 144. During operation, open subscription module 204 communicates with architecture model 208, which represents various parties, sites and locations involved in the tax operations in a standardized format.

Geography model 210 contains information about the geographical boundaries of the various jurisdictions associated with different tax regimes.

Tax rules navigator 212 facilitates access to tax data contained in knowledge base 214 and tax rules contained in rule base 216. Note that knowledge base 214 and tax rules 216 may actually reside within database 134 illustrated in FIG. 1.

Tax determination manager (TDM) 217 is called by TSRM 202 to determine the local jurisdiction for which tax computation needs to be performed. TDM 217 uses information from architecture model 208 and geography model 210 in ascertaining the local jurisdictions. Optionally, TDM 217 can use tax rules navigator 212 to access the necessary information contained within the knowledge base 214 and/or rule base 216.

After the local jurisdictions (for which tax must be computed) are identified, TSRM 202 invokes the services of either tax service 144 or TDM 217 to perform the computations for each of the identified local jurisdictions. In deciding whether to use tax service 144, TSRM 202 makes use of information in the open subscription model 204.

When the TDM 217 is used to perform the computations for one or more local jurisdictions, it makes use of trading community model 208 and geography model 210, as well as the tax rules navigator 212. (Tax rules navigator 212 is used to access relevant information from knowledge base 214 and rule base 216.)

TSRM 202 then invokes the services of TDM 217 to collect and summarize the information of the results of the various tax computations performed. In doing so, TDM 217 uses tax rules navigator 212 to access information from the knowledge base 214 and/or rule base 216. TSRM 202 then returns the information, summarized to the appropriate level as above, to the request 201.

Finally, tax repository manager 206 stores a cumulative history of tax services rendered so far by the system.

The above-described components work together to provide tax services as is described below with reference to FIGS. 3-6.

Operation of Tax Service

Figure 3:
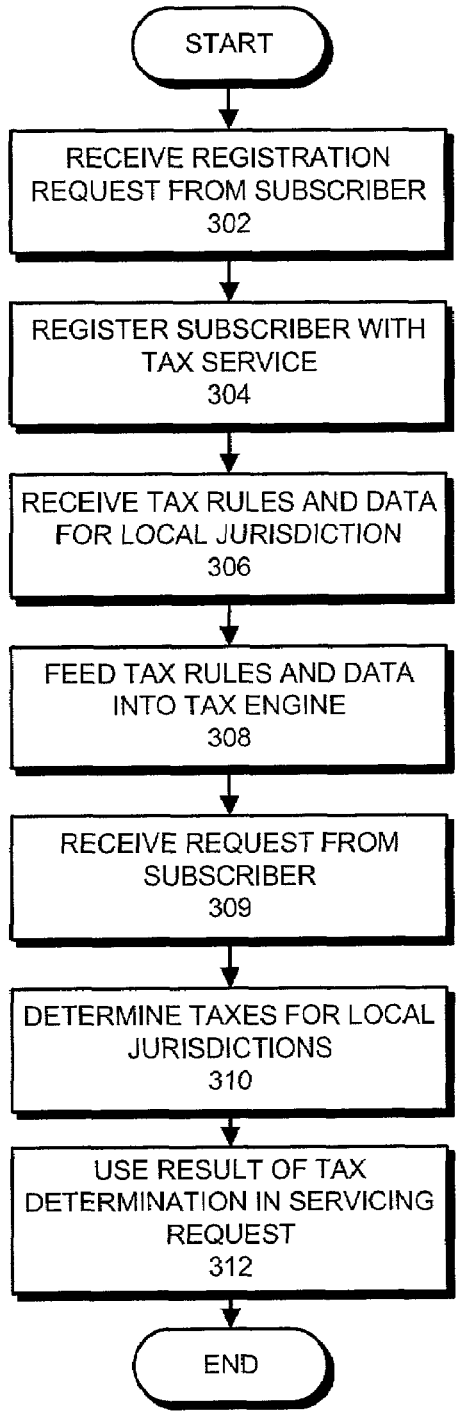
FIG. 3 is a flow chart illustrating operations performed by the tax service in accordance with an embodiment of the present invention.

FIG. 3 is a flow chart illustrating operations performed by tax service 132 in accordance with an embodiment of the present invention. The system initially receives a request for registration from a subscriber, such as party 112 operating on client 102 (step 302). In response to this request, the system registers the subscriber with tax service 132 (step 304). In doing so, the system can register the subscriber to have access to one or more external services, such as tax service 144.

The system also receives tax rules and data 142 for one or more local jurisdictions (step 306). The system feeds tax rules and data 142 into rule base 212 and knowledge base 214 using services provided by TDM 217 and TCM 218. (step 308)

Next, the system receives a request from the subscriber (step 309), wherein servicing the request involves calculating a tax for a local jurisdiction. In response to this request, the system calculates the tax for the local jurisdiction by using the tax rules and tax data stored in knowledge base 214 and rule base 216 (step 310). The system subsequently uses a result of this calculation in order to service the request (step 312).

For example, the request from the subscriber may involve a sale of an item. In this case, the system first determines the local jurisdiction using the geography model 210. Further, it could identify that a local sales tax is the applicable tax using the knowledge base 214. The system could also determine the taxable basis and tax status using the knowledge base 214. The system may optionally also use the rule base 216 to determine the taxable basis. Similarly, the system could lookup the tax rate from the knowledge base 214. The system may also determine that a reduced rate applies for the local sales tax, by applying a rule from rule base 216. Note that the service request may be initiated by an external system while performing a financial transaction to complete the sale.

Unlike prior tax computation systems, the above-described system allows new jurisdictional rules to be implemented by merely loading additional data and rules. Time-consuming programming is not required to effect changes in tax rules. Also, there is little or no necessity on the part of the calling system to be aware of such changes.

Process of Determining Taxes

Figure 4:
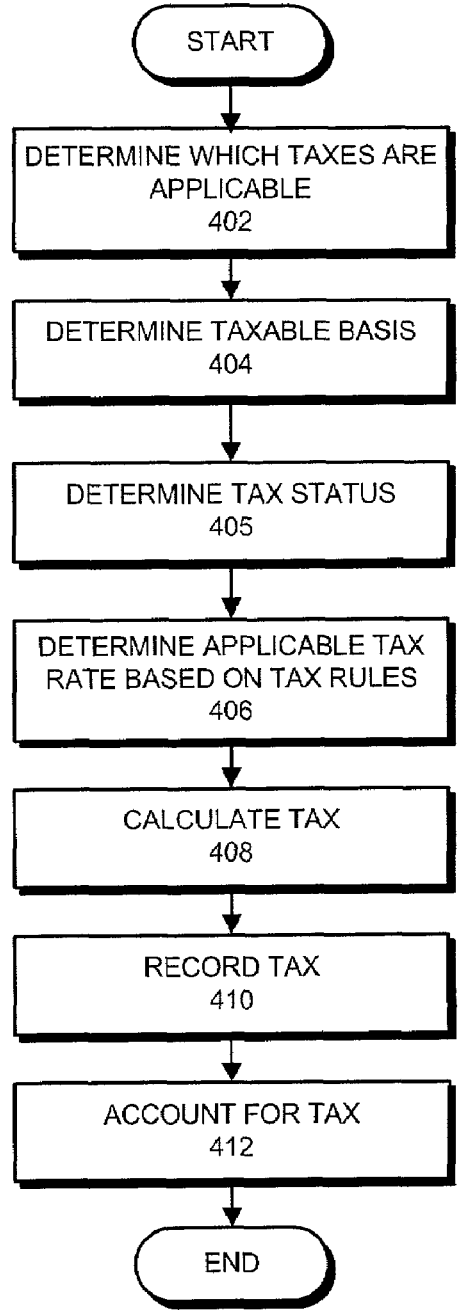
FIG. 4 is a flow chart illustrating the process of determining taxes in accordance with an embodiment of the present invention.

FIG. 4 is a flow chart illustrating the process of determining taxes in accordance with an embodiment of the present invention. The system starts by determining which taxes are applicable (step 402). This may involve determining the tax regimes involved. Furthermore, within a given tax regime, the system (or, more specifically, TDM 217 determines the taxes and the tax jurisdictions that are involved. TDM 217 determines the tax regimes, taxes and tax jurisdictions involved using the knowledge base 214 and, optionally, the tax rules navigator 212 and tax rule base 216.

TABLE 1

| Country | Tax Regime | Tax | Tax Type | Tax Jurisdiction |
|---|---|---|---|---|
| United States | US Sales Tax | State Sales Tax | Sales Tax | California (State) |
|  | US Sales Tax | Local Sales Tax | Sales Tax | San Jose (City) |
| Canada | Canadian Goods and Services Tax | GST | GST | Canada/Ontario (Country/Province) |
|  | Canadian Goods and Services Tax | HST | GST | Canada/New Brunswick (Country/Province) |
|  | Canadian Sales Tax | PST | Sales Tax | Ontario (Province) |
| Singapore | Singapore Goods and Services Tax | GST | GST | Singapore (Country) |
| India | India Excise and Customs | Excise Tax | Excise Tax | India (Country) |
|  | India Excise and Customs | Additional Excise Tax | Excise Tax | India (Country) |
|  | India Excise and Customs | Customs Duty | CUSTOMS | India (port of entry) |
| Brazil | RICMS - Brazil ICMS Rules | ICMS | ICMS | Sao Paulo (City) |
|  | RICMS - Brazil ICMS Rules | ICMS-ST | ICMS | Sao Paulo (City) |
|  | RIPI - Brazil IPI Rules | IPI | IPI | Brazil (Country) |
| Portugal | Portugal VAT | Domestic VAT | VAT | Portugal (Country) |
| Portugal | Portugal VAT | Inter-EU VAT | VAT | Portugal (Country) |

For example, a jurisdiction may include a country, a state within a country, a county within a state, or a city within a county. A tax regime may include a set of different taxes that fall under a specific jurisdictional authority. Finally, a tax may include any tax involved in a business transaction, such as a sales tax or a value added tax. For example, Table 1 illustrates different tax regimes, tax jurisdictions and taxes for different countries. Table 1, reading from left to right, goes from the highest level to the most detailed level of granularity. There may be one or more tax regimes in a country; each regime can consist of one or more taxes. Each tax is of a given tax type, which is a high level classification such as Sales Tax, Excise Tax and Mineral Oil Tax; and each tax can be levied in one or more tax jurisdictions (for one or more geographical elements).

TDM 217 determines the taxable basis for each applicable tax, using the knowledge base 214 and, optionally, the tax rules navigator 212 and tax rule base 216 (step 404). TDM 217 then determines the tax status for each applicable tax, using the knowledge base 214 and, optionally, the tax rules navigator 212 and tax rule base 216 (step 405). TDM 217 then determines the tax rate, using the knowledge base 214 and, optionally, the tax rules navigator 212 and tax rule base 216 (step 406).

This enables TDM 217 to subsequently calculate the tax involved in the transaction (step 408). Tax repository manager 206 then records the calculated tax (step 410). The system can be utilized to account for the tax involved in the transaction by communicating the tax information, possibly along with other non-tax-related transactional information, to an accounting system (see 220 in FIG. 2) (step 412) capable of interpreting the same and creating the relevant accounting entries.

Note that the above-described system is modularized so that the means of acquiring the data in the knowledge base 214 and/or the rule base 216 do not affect the means of fulfilling a service request.

In other words, gathering, receiving and storing data in the knowledge base 214 and/or the rule base 216 can be accomplished by using a computer readable format, either procured from a third party (provider) or obtained from other sources, such as a tax authority (responsible for administering one or more taxes in the local jurisdiction). It can also be entered manually by a tax professional/end user.

The process of servicing requests from a subscriber can involve performing all determinations and calculations using the system (712). This entails determining all the local jurisdictions for which tax may need to be determined. For each local jurisdiction, the system determines all the applicable taxes (402) of the local jurisdiction. For each applicable tax of the local jurisdiction, the system determines the taxable basis (404), which may in turn need the tax (amount) of another applicable tax. The system also determines the tax status (405), tax rate (406) and tax amount (408), which may in turn need the tax amount of another applicable tax to calculate, for instance, its own taxable basis.

Figure 7:
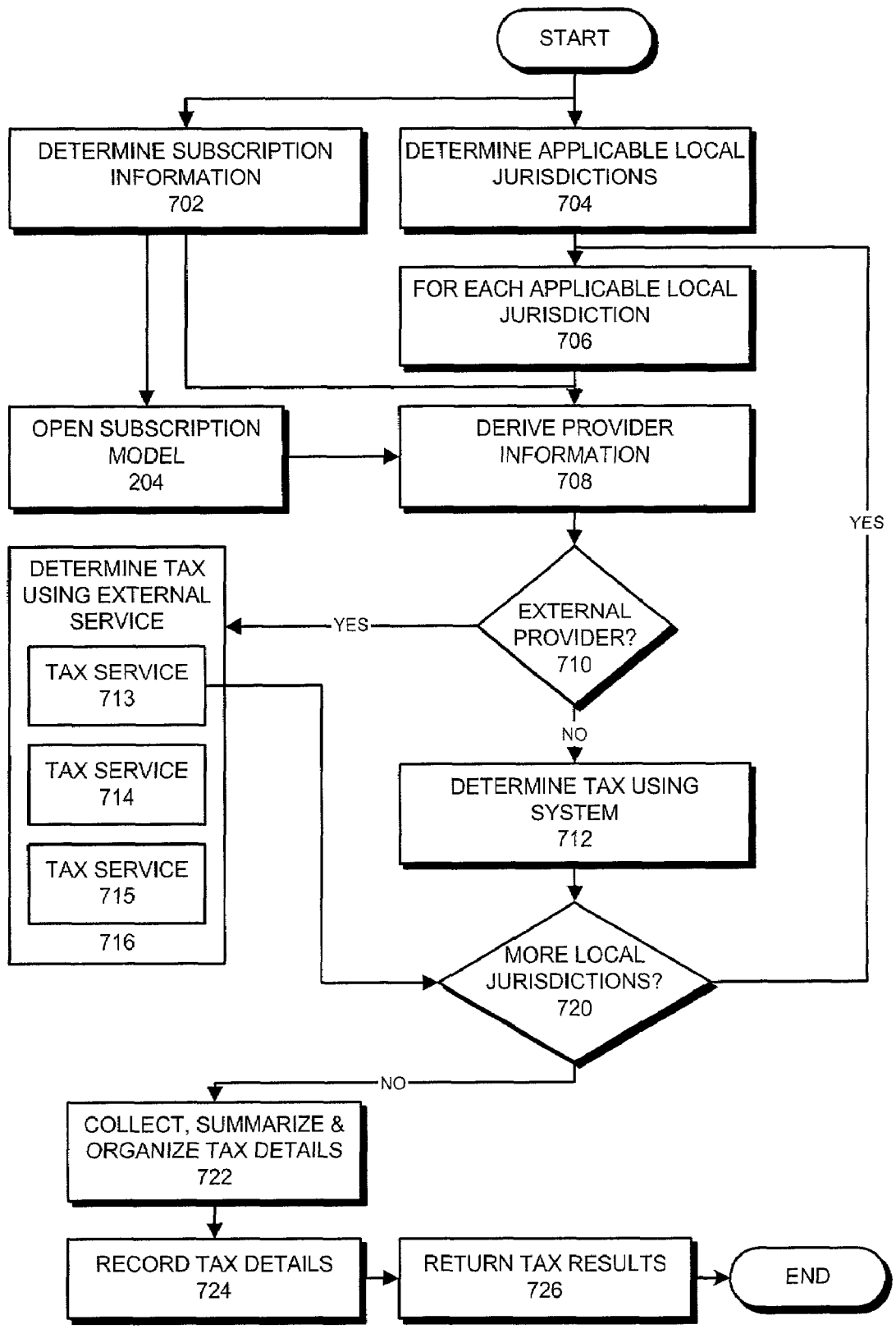
FIG. 7 is a flow chart illustrating the process of determining local taxes in accordance with an embodiment of the present invention.

Referring to FIG. 7, the system also collects and organizes (722) the tax details for all local jurisdictions, which may involve performing computations pertaining to balances due to/from Tax Authorities, if necessary.

The system additionally records tax amounts (410, 724) and details for each applicable tax, if necessary.

The system then returns tax information (312, 726) in the requisite level of summarization, thereby servicing the request.

Alternatively, tax determination and calculation can be done utilizing services provided by a third party. This involves first determining all the local jurisdictions for which tax may need to be determined (704). Next, for each local jurisdiction, the system determines, using the Open Subscription Model (204), the identity of the third party to perform the determination and calculation for the local jurisdiction. The system then sends a service request to the third party with the necessary details for the local jurisdiction (713-716), and receives the tax details for the local jurisdiction from the third party.

The system also collects and organizes the tax details for all local jurisdictions (722). This may involve performing computations pertaining to balances due to/from Tax Authorities, if necessary.

The system additionally records tax amounts (724) and details for each applicable tax, if necessary, and returns tax information (726) in the requisite level of summarization, thereby servicing the request.

Note that the system may also perform tax determinations and calculations partially utilizing services provided by a third party.

Operations Performed by Tax Service

Figure 5:
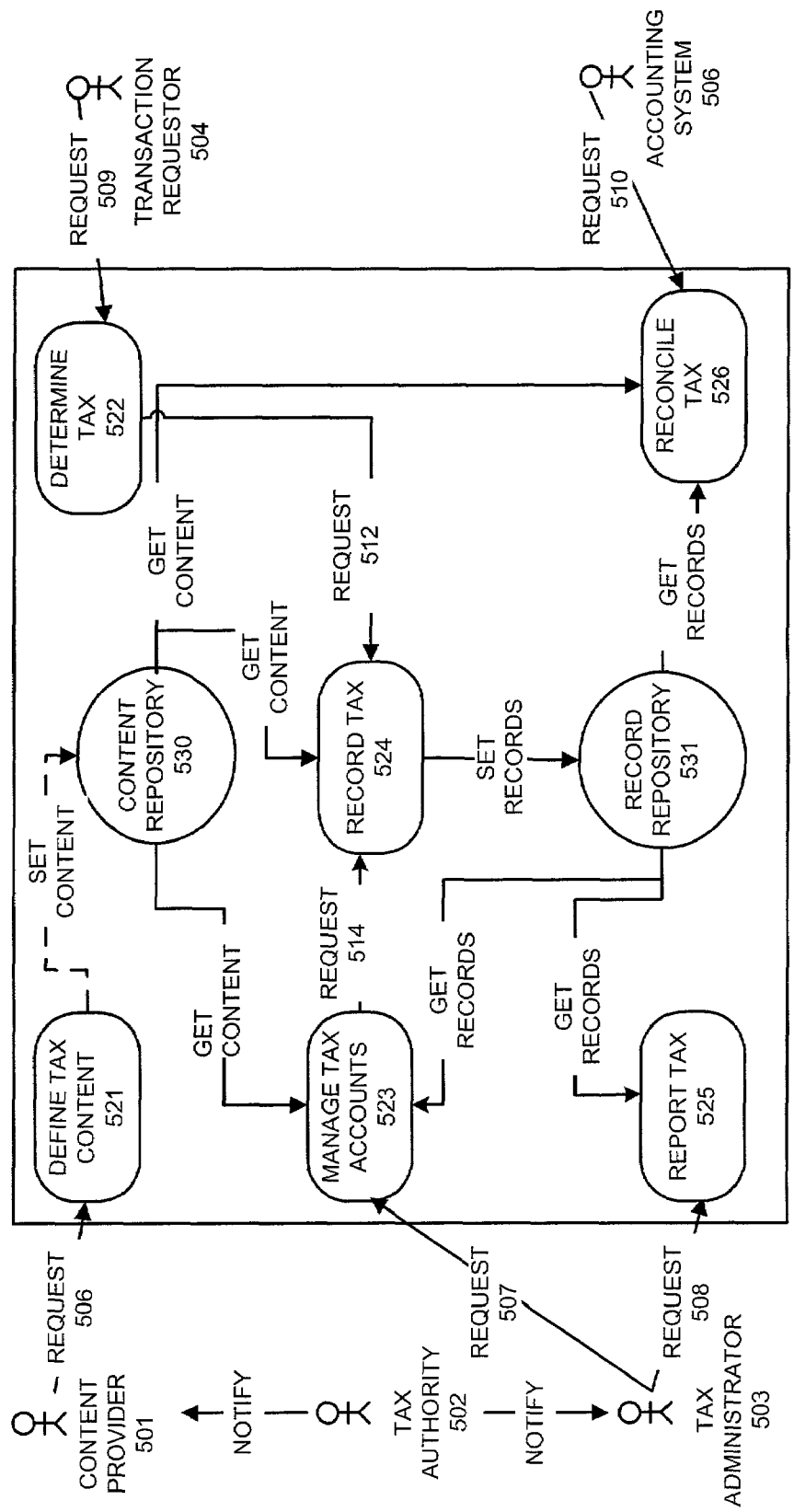
FIG. 5 is a diagram illustrating operations performed by the tax service in accordance with an embodiment of the present invention.

FIG. 5 is a diagram illustrating operations performed by tax service 132 in accordance with an embodiment of the present invention. The enterprise model illustrated in FIG. 5 represents the componentization of tax, that is, what tax is (as opposed to how it is implemented), and defines some key interactions. More specifically, FIG. 5 depicts a system that provides Tax Services, represented by the System Boundary and everything within it, and the outside world, represented by "actors" who interact with the system across the system boundary. An actor represents a person or system, external to the system under consideration, who interacts with the system in a specific role. For example, some of the actors in FIG. 5 are: Content Provider 501, Tax Authority 502 and Accounting System 506. Note that the processes defined within the box are essentially hidden from these actors.

The services provided by the system are the public face of the tax domain. Rather like an ATM machine, these services clearly announce what they will do. Moreover, clear instructions are provided on how to interact with tax service 132, and what to expect as an outcome.

To understand this diagram, consider an ATM as a system. Examples of actors are "Account Holder", "Maintenance Person" and "Currency Note Filler". External services are like the services that an "Account Holder" (actor) can avail of at an ATM—such as "Deposit Cash", and "Withdraw Cash". There may be different services available to other actors, such as", "Maintenance Person" and "Currency Note Filler". Internal Services are like "Debit Account", and "Confiscate Card" which cannot be seen by an actor.

Within the system boundary, the system providing tax services is composed of a number of services, such as the Define Tax Content service 521. The arrows emanating from an actor and which have "Request" alongside, are services which are "exposed" to the external world. Examples are manage tax accounts 523 and determine tax 522. Services such as record tax 524 are not allowed to be directly requested by an actor.

The services illustrated in FIG. 5 operate on a content repository 530 as well as a record repository 531. Content repository 530 includes knowledge base 214 and rule base 216. It is the primary source of tax information for tax services and includes knowledge about transaction-based taxes. A key interaction with content repository happens through the "define tax content" service 521, which is used to input data into content repository 530.

Record repository 531 stores information relating to tax events and tax status. It stores tax records along with any relevant changes to the tax records. Hence, it essentially contains the current, historical record of the results of interactions of the tax domain with the outside world. It also serves as a key source of information in: managing tax liabilities and assets with tax authorities; reporting taxpayer audit information on taxes collected or accrued; and in providing tax information for analysis and planning. A key interaction with record repository 531 happens through the "record tax" service 524.

The "define tax content" service 521 provides methods to manage permanent definitions within content repository 530 for the tax domain. These methods can include adding, updating, disabling, purging, validating or listing data.

The "determine tax" service 522 uses information from both content repository 530 and record repository 531 to determine the applicable taxes; determine the tax status for a given tax; determine the tax rate for a tax status of a specific tax; calculate the tax amount given the tax rate. It is composed of a number of internal services (not shown in the diagram), which make use of rules in the rule base 216 as well as the information contained in knowledge base 214.

The "manage tax accounts" service 523 provides a number of services to support administration, including the settlement of liabilities to a tax authority and recovery of amounts owed by a tax authority. The manage tax accounts service 523 may additionally maintain cumulative fiscal balances for a taxpayer and the current balances in tax authority specified registers.

The "record tax" service 524 is used to maintain record repository 531. It is typically called by other services, such as determine tax service 522 and manage tax accounts service 523.

The "report tax" service 525 manages and responds to the various reporting needs that a tax domain management system may have to support. It generally extracts raw data from record repository 531 and makes it presentable to the outside world. Note that this raw data may be formatted into report form, or alternatively as a data set that is capable of being reformatted by a reporting tool.

Figure 6:
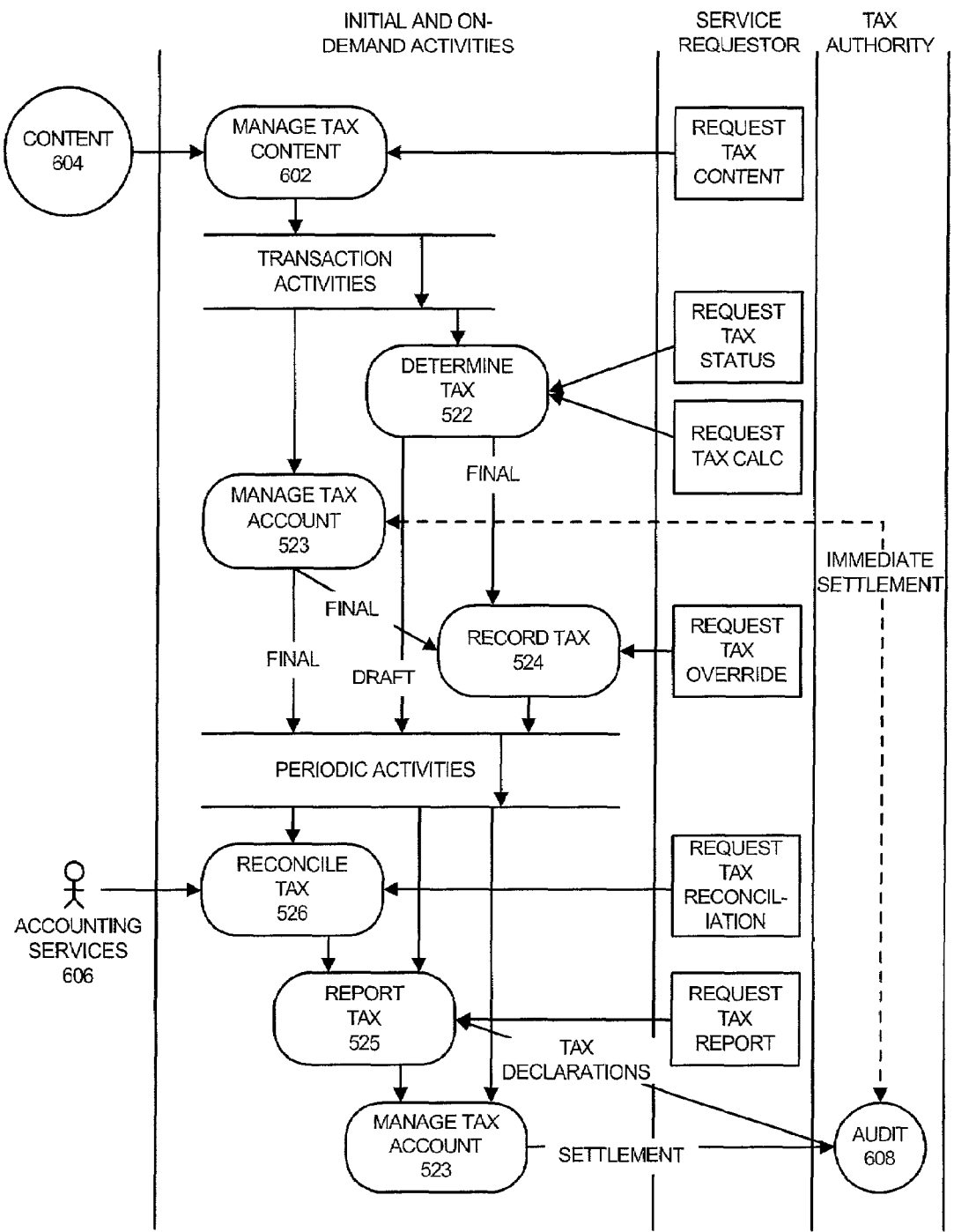
FIG. 6 is an activity diagram illustrating the temporal nature of operations performed by the tax service in accordance with an embodiment of the present invention.

FIG. 6 is an activity diagram illustrating the temporal nature of operations performed by tax service 132 in accordance with an embodiment of the present invention. FIG. 6 generally illustrates interactions that occur within the tax domain from the perspective of the three main "temporal" activities.

Note that diagram is split vertically into "swim lanes". The vertical bars between the swim lanes represent separation between actors. The passage of time is represented by vertical arrows from top to bottom. For example, a request to Determine Tax 522 happens after the request to Manage Tax Content 602 is completed. Horizontal lines represent a point in time. Activities represented by arrows flowing down to a horizontal line must be completed before any activity below the horizontal line can begin.

Each service can be accessed via an application programming interface (API), or alternatively through a message from an external requester. Once a request is passed to a service, the service is responsible for determining the relevant actions needed to fulfill the request.

A first set of activities are "occasional activities" that mainly involve setup and content management. These are actions that do not occur on a regular basis, and include actions such as purging, or requiring a service to upload revised or new tax information.

A second set of activities are "transaction activities" that occur more frequently and may require one or more services. These activities may include actions such as determining tax and managing tax account information.

A third set of activities are "periodic activities" that are performed routinely at periodic intervals. These activities can include preparing tax declarations and remittances to tax authorities for a given tax period.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing a configurable tax service, comprising:

receiving a tax computation request from a subscriber at a system which comprises a tax-rule-base module which stores tax rules and a tax-knowledge-base module which stores tax data, wherein the tax-rule-base module is separate from the tax-knowledge-base module;

receiving the tax rules for a local jurisdiction from an external source;

feeding the tax rules into a tax engine that is configured to use externally specified rules for local jurisdictions in performing tax computations, wherein the tax engine determines at least a tax regime and a tax jurisdiction at a given level of granularity;

using the tax engine to calculate the tax for the local jurisdiction, wherein the tax engine determines an applicable tax, a taxable basis for the applicable tax, and a tax status for the applicable tax using the tax rules for the local jurisdiction from the tax-rule-base module and the tax data from the tax-knowledge-base module;

using a result of the calculations in servicing the request;

recording the result; and using the recorded results to report tax liabilities and assets to a tax authority for the local jurisdiction at periodic intervals.

2. The method of claim 1, wherein receiving the tax rules additionally involves receiving tax data for the local jurisdiction, wherein the tax data includes one or more tax rates.

3. The method of claim 2, wherein feeding the tax rules into the tax engine involves:

storing the tax rules in the tax-rule-base module; and storing the tax data in the tax-knowledge-base module.

4. The method of claim 1, wherein receiving the tax rules for the local jurisdiction involves receiving the tax rules from a third party.

5. The method of claim 1, wherein servicing the request optionally involves utilizing a service provided by a third party in order to service the request.

6. The method of claim 1, wherein calculating the tax involves:

calculating the tax based on the determined applicable tax, the taxable basis, and the tax status; and feeding the result of the calculation to an external system such as an accounting system.

7. The method of claim 1, wherein prior to receiving the request from the subscriber, the method further comprises:

receiving a registration request from the subscriber to register with the tax service; and registering the subscriber with the tax service, so that the subscriber can send requests to the tax service.

8. A computer-readable storage medium storing instructions that when executed by a computer cause the computer to perform a method for providing a configurable tax service, the method comprising:

receiving a tax computation request from a subscriber at a system which comprises a tax-rule-base module which stores tax rules and a tax-knowledge-base module which stores tax data, wherein the tax-rule-base module is separate from the tax-knowledge-base module;

receiving the tax rules for a local jurisdiction from an external source;

feeding the tax rules into a tax engine that is configured to use externally specified rules for local jurisdictions in performing tax computations, wherein the tax engine determines at least a tax regime and a tax jurisdiction at a given level of granularity;

using the tax engine to calculate the tax for the local jurisdiction, wherein the tax engine determines an applicable tax, a taxable basis for the applicable tax, and a tax status for the applicable tax using the tax rules for the local jurisdiction from the tax-rule-base module and the tax data from the tax-knowledge-base module;

using a result of the calculations in servicing the request; recording the result; and using the recorded results to report tax liabilities and assets to a tax authority for the local jurisdiction at periodic intervals.

9. The computer-readable storage medium of claim 8, wherein receiving the tax rules additionally involves receiving tax data for the local jurisdiction, wherein the tax data includes one or more tax rates.

10. The computer-readable storage medium of claim 9, wherein feeding the tax rules into the tax engine involves:

storing the tax rules in the tax-rule-base module; and storing the tax data in the tax-knowledge-base module.

11. The computer-readable storage medium of claim 8, wherein receiving the tax rules for the local jurisdiction involves receiving the tax rules from a third party.

12. The computer-readable storage medium of claim 8, wherein servicing the request optionally involves utilizing a service provided by a third party in order to service the request.

13. The computer-readable storage medium of claim 8, wherein calculating the tax involves:

calculating the tax based on the determined applicable tax, the taxable basis, and the tax status; and feeding the result of the calculation to an external system, such as an accounting system.

14. The computer-readable storage medium of claim 8, wherein prior to receiving the request from the subscriber, the method further comprises:

receiving a registration request from the subscriber to register with the tax service; and registering the subscriber with the tax service, so that the subscriber can send requests to the tax service.

15. An apparatus that provides a configurable tax service, comprising:

a receiving mechanism that is configured to receive a tax computation request from a subscriber at a system which comprises a tax-rule-base module which stores tax rules and a tax-knowledge-base module which stores tax data, wherein the tax-rule-base module is separate from the tax-knowledge-base module;

a tax engine that is configured to use externally specified rules for local jurisdictions in performing tax computations;

wherein the tax engine determines at least a tax regime and a tax jurisdiction at a given level of granularity;

wherein the tax engine is configured to access tax rules for a local jurisdiction from an external source;

wherein the tax engine determines an applicable tax, a taxable basis for the applicable tax, and a tax status for the applicable tax using the tax rules for the local jurisdiction from the tax-rule-base module and the tax data from the tax-knowledge-base module; and wherein the tax engine is configured to calculate the tax for the local jurisdiction;

a servicing mechanism that is configured to use a result of the calculations in servicing the request;

a recording mechanism configured to record the result; and a reporting mechanism configured to periodically report tax liabilities and assets to a tax authority for the local jurisdiction at periodic intervals using the recorded results.

16. The apparatus of claim 15, wherein the receiving mechanism is additionally configured to receive tax data for the local jurisdiction, wherein the tax data includes one or more tax rates.

17. The apparatus of claim 15, wherein the receiving mechanism is configured to receive the tax rules from a third party.

18. The apparatus of claim 15, wherein the servicing mechanism is configured to service the request by utilizing a service provided by a third party.

19. The apparatus of claim 15, wherein while calculating the tax, the tax engine is configured to:

calculate the tax based on the determined applicable tax, the taxable basis, and the tax status; and feed the result of the calculation to an external system, such as an accounting system.

20. The apparatus of claim 15, further comprising a registration mechanism that is configured to:

receive a registration request from the subscriber to register with the tax service; and to register the subscriber with the tax service, so that the subscriber can send requests to the tax service.

21. The method of claim 1, wherein using the tax engine to calculate the tax involves using tax rules for multiple local jurisdictions.

22. The method of claim 1, wherein prior to receiving the tax rules, the method further comprises receiving the tax rules from an external tax expert for the local jurisdiction.

23. The computer-readable storage medium of claim 8, wherein using the tax engine to calculate the tax involves using tax rules for multiple local jurisdictions.

24. The computer-readable storage medium of claim 8, wherein prior to receiving the tax rules, the method further comprises receiving the tax rules from an external tax expert for the local jurisdiction.

25. The apparatus of claim 15, wherein the tax engine is configured to use tax rules for multiple local jurisdictions.

26. The apparatus of claim 15, wherein the receiving mechanism is configured to receive the tax rules from an external tax expert for the local jurisdiction.

\* \* \* \* \*

UNITED STATES PATENT AND TRADEMARK OFFICE
CERTIFICATE OF CORRECTION

PATENT NO.       : 7,693,760 B1
APPLICATION NO.  : 10/106729
DATED            : April 6, 2010
INVENTOR(S)      : Alexander O. Fiteni et al.

It is certified that error appears in the above-identified patent and that said Letters Patent is hereby corrected as shown below:

In column 11, line 14, in Claim 11, delete "claim 8," and insert -- claim 10, --, therefor.

Signed and Sealed this
Twenty-second Day of February, 2011

David J. Kappos
*Director of the United States Patent and Trademark Office*